United States Patent
Arakawa et al.

(10) Patent No.: US 8,695,671 B2
(45) Date of Patent: Apr. 15, 2014

(54) PREPREG LAMINATION HEAD AND PREPREG AUTOMATIC LAMINATION DEVICE EQUIPPED WITH SAME

(75) Inventors: Daiki Arakawa, Tokyo (JP); Jun Eto, Tokyo (JP); Koji Yamada, Tokyo (JP); Masayuki Kokubu, Tokyo (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 133 days.

(21) Appl. No.: 13/512,365

(22) PCT Filed: Feb. 24, 2011

(86) PCT No.: PCT/JP2011/054153
§ 371 (c)(1),
(2), (4) Date: May 29, 2012

(87) PCT Pub. No.: WO2011/105491
PCT Pub. Date: Sep. 1, 2011

(65) Prior Publication Data
US 2012/0227907 A1    Sep. 13, 2012

(30) Foreign Application Priority Data
Feb. 26, 2010    (JP) .................. 2010-042316

(51) Int. Cl.
*B32B 37/00*    (2006.01)
(52) U.S. Cl.
USPC ............ 156/542; 156/541; 156/555; 156/582
(58) Field of Classification Search
USPC ......... 156/538, 539, 540, 541, 542, 555, 580, 156/582, 583.1
See application file for complete search history.

(56) References Cited

U.S. PATENT DOCUMENTS 5,397,415 A * 3/1995 Manabe et al. ............... 156/234
5,480,508 A * 1/1996 Manabe et al. ............... 156/353
(Continued)

FOREIGN PATENT DOCUMENTS

JP    4-62142    2/1992
JP    4-344225    11/1992
(Continued)

OTHER PUBLICATIONS

International Search Report issued Apr. 5, 2011 in International (PCT) Application No. PCT/JP2011/054153.

(Continued)

*Primary Examiner* — James Sells
(74) *Attorney, Agent, or Firm* — Wenderoth, Lind & Ponack, L.L.P.

(57) ABSTRACT

A prepreg lamination head and a prepreg automatic lamination apparatus with the same is provided. By using them, the curling-up of the cut terminal portion of the prepreg sheet can be prevented. The prepreg lamination head includes: a first roller, a second roller, and a forward-placed paper liner peeling device. The forward-placed paper liner peeling device includes a third roller, which is provided between and above the first and second rollers. The paper liner attached on the first side of the prepreg sheet is peeled off right after passing the first roller. The peeled paper liner is hanged over the third roller between the first and second rollers. The third roller guides the peeled paper liner to the second roller. The prepreg sheet is pressed on the laminated body with the second roller through the paper liner.

6 Claims, 3 Drawing Sheets

(56) References Cited

U.S. PATENT DOCUMENTS

| | | | |
|---|---|---|---|
| 7,293,590 B2 * | 11/2007 | Martin | 156/361 |
| 2005/0016670 A1 * | 1/2005 | Kanbara et al. | 156/257 |

FOREIGN PATENT DOCUMENTS

| | | |
|---|---|---|
| JP | 6-91639 | 4/1994 |
| JP | 6-114964 | 4/1994 |
| JP | 07-026099 | 6/1995 |
| JP | 2004-017625 | 1/2004 |
| JP | 2004-017633 | 1/2004 |
| JP | 2004-181683 | 7/2004 |
| JP | 2006-218720 | 8/2006 |

OTHER PUBLICATIONS

Written Opinion of the International Searching Authority issued Apr. 5, 2011 in International (PCT) Application No. PCT/JP2011/054153.

* cited by examiner

PREPREG LAMINATION HEAD AND PREPREG AUTOMATIC LAMINATION DEVICE EQUIPPED WITH SAME

TECHNICAL FIELD

The present invention relates to a prepreg lamination head for laminating prepreg sheets having a fiber sheet impregnated with resin to form a prepreg laminated body, and a prepreg automatic lamination apparatus having the same.

Priority is claimed on Japanese Patent Application No. 2010-042316, filed Feb. 26, 2010, the content of which is incorporated herein by reference.

BACKGROUND ART

Conventionally, multiple prepreg sheets (FRP sheet) having a fiber sheet impregnated with resin are laminated to manufacture a prepreg laminated body (form a composite material), and this prepreg laminated body is used to manufacture (form) the main wings, a fuselage, a main plane, or the like of an aircraft. Additionally, carbon fibers are frequently used as fibers because the carbon fibers have excellent features, such as light weight, high strength, and high elasticity.

The prepreg sheet is formed by aligning the fiber directions of multiple fibers. It is formed in a state where the fiber sheet is impregnated in an ultraviolet curable resin or a thermosetting resin as the impregnation resin and in a state where the resin is half-cured (imperfectly cured or uncured). For this reason, a paper liner is stuck to a surface (or both surfaces) of the prepreg sheet.

The prepreg laminated body is manufactured (formed) by removing the paper liner from the prepreg sheet and integrally laminating the multiple prepreg sheets while making the fiber directions to intersect each other. The prepreg laminated body is manufactured by laminating a prepreg sheet (angle layer) in which fiber directions are turned, for example, in the 45 degree direction or in the 90 degree direction on a prepreg sheet whose fiber direction is in 0-degree direction (0-degree layer). Then, on top of the angled layer, a prepreg sheet in the 0 degree direction (0-degree layer) is further laminated. As explained above. The prepreg laminated body is manufactured by laminating a pre-determined number of prepreg sheets on a work (a work to be laminated) integrally formed by prepreg sheets having fiber directions in the prepreg sheets intersecting to the fiber direction of the previous layer sequentially.

On the other hand, in order to efficiently manufacture a flat-plate-shaped prepreg laminated body quickly, a prepreg automatic lamination apparatus is proposed and put into practical use (for example, refer to PTL 1, PTL 2, and PTL 3).

For example as shown in FIG. 2, the prepreg automatic lamination apparatus A includes: a lamination table 2 that is provided on a stand 1 and placed so as to freely advance and retreat in the direction T1; a pair of gate-type supports 3 and 4 enclosing the lamination table 2 therebetween with an interval in the direction T1; a 0-degree layer lamination head 5 (prepreg lamination head) that is supported by the gate-type support 3 and disposed above the lamination table 2; and an angled layer lamination head 6 on the lamination table 2. The angled layer lamination head 6 is rotatably supported by the second gate-type support 4 allowing rotation around an axis that extends in a vertical direction.

The 0-degree layer lamination head 5 includes: a feed roller 9, around which a prepreg sheet 8 with a paper liner 7 attached on one of its surface is reeled; a support roller 10 that supports the prepreg sheet 8 fed from the feed roller 9 by being wrapped around by the prepreg sheet 8; a die cutter 11, which is provided between the feed roller 9 and the support roller 10 and cuts the prepreg sheet 8 alone in a pre-determined length (to fit to the size of a piece of the work to be laminated) without cutting the paper liner 7; a front pressing roller (first roller) 12, which guides in the direction T1 for the prepreg sheet 8 to be laminated on the work placed on the lamination table 2 and applies the prepreg sheet 8 on the work by pressing the prepreg sheet 8 from the surface which had the paper line 7; a rear pressing roller (second roller) 13, which presses again the prepreg sheet 8 that has passed the front pressing roller 12 and peels the paper liner 7 from the prepreg sheet 8; and a paper liner recovery roller 14 that recovers the paper liner 7 that was peeled off from the prepreg sheet 8.

The angled layer lamination head 6 includes: a feed roller 15, around which a prepreg sheet 8 with a paper liner 7 attached on one of its surface is reeled; a support roller 16 that supports the prepreg sheet 8 fed from the feed roller 15 by being wrapped around by the prepreg sheet 8; a die cutter 17, which is provided between the feed roller 15 and the support roller 16 and cuts the prepreg sheet 8 alone in a pre-determined length (to fit to the size of a piece of the work to be laminated) without cutting the paper liner 7; a guide roller 18a, which guides the prepreg sheet 8 fed from the support roller 16 to be laminated on the work; a scraper roller (guide roller) 18b, which guides the prepreg sheet 8 to be laminated on the work working together with the guide roller 18a and peels off the paper liner 7 from the prepreg sheet 8; a lamination shoe 19, which is provided between the guide roller 18a and scraper roller 18b, is able to shift its position back and forth, and presses the prepreg sheet 8 for the prepreg sheet 8 to be laminated on the work placed on the lamination table 2; a paper liner recovery roller 20 that recovers the paper liner 7.

When the prepreg sheet 8 is laminated on the work by the 0-degree layer lamination head 5, the paper liner recovery roller 14 is rotated, the paper liner 7 is pulled, and the prepreg sheet 8 is fed from the feed roller 9. Also, during the feeding of the prepreg sheet 8 from the feed roller 9, the prepreg sheet 8 alone is kept being cut by the die cutter 11 in a pre-determined length. The prepreg sheet 8 that is cut up in this way is sent so as to run along the top face of the work through the support roller 10, and is pressed against the work from the paper liner 7 side by the front pressing roller 12 (primary transfer pressing). Thereby, the cut piece of the prepreg sheets 8, which are obtained by cutting and dividing the prepreg sheet 8, are applied on the work to be laminated repeatedly and integrally laminated on the work. By passing through the rear pressing roller 13, the prepreg sheet 8 applied on the work is pressed again (Secondary transfer pressing), while the paper line 7 is peeled off from the prepreg sheet 8 and rolled up by the paper liner recovery roller 14. In this way, the prepreg sheet 8 of 0-degree layer, the fiber direction of which is along with the length direction of the work (length direction of the prepreg laminated body, the conveying direction of the lamination table 2, the first direction T1), is laminated on the work with the 0-degree layer lamination head 5.

On the other hand, the work on which the prepreg sheet 8 is laminated by the 0-degree layer lamination head 5 is conveyed toward the angled layer lamination head 6 by the lamination table 2. When the prepreg sheet 8 is laminated on the work by the angled layer lamination head 6, the angled layer lamination head 6 is rotated and, disposed so as to have a predetermined intersection angle of, for example, 45 degrees or 90 degrees with respect to the length direction (the conveying direction of the lamination table 2 or the first direction T1) of the work, and the paper liner recovery roller 20 is rolled in this state.

Consequently, the paper liner 7 is pulled, the prepreg sheet 8 is fed from the feed roller 15, and only the prepreg sheet 8 is cut up at every predetermined length by the die cutter 17. At this time, the prepreg sheet 8 is cut up so as to be divided into a shape (for example, a rhomboidal shape when a 45-degree layer is laminated and formed on the work) according to the piece to be laminated of the work.

In the stage where the prepreg sheet 8 is set so as to be run along the top face of a work W with a guide roller 18a and the scraper roller 18b from the support roller 16 in this way, the lamination shoe 19 moves in the fiber direction (intersection direction T2) of the prepreg sheet 8 while pressing the prepreg sheet 8. Thereby, a cut piece S1 of the prepreg sheet 8 cut up and divided by the die cutter 17 is applied as a stack on the piece to be laminated of the work W, and is integrally laminated. Additionally, while passing through the scraper roller 18b, only the paper liner 7 is peeled off from the prepreg sheet 8 applied to the work W and reeled around the paper liner recovery roller 20. In this way, the angle layer prepreg sheet 8, the fiber direction T2 of which intersects the length direction of the work W (which is the fiber direction of T1 of the prepreg sheet 8 in the 0-degree layer), is laminated on the work W with the angled layer lamination head 6.

As described above, the prepreg laminated body is manufactured by sequentially laminating the prepreg sheets 8 by the 0-degree layer lamination head 5 and the angled layer lamination head 6 while making the fiber directions T1 and T2 to intersect each other.

Related Art Literature

Patent Literature 1: JP-A-2004-17625
Patent Literature 2: JP-A-2004-17633
Patent Literature 3: JP-A-2004-181683

DISCLOSURE OF INVENTION

Problems to be Solved

However, in the above related-art prepreg automatic lamination apparatus A, the prepreg sheet 8 and the paper liner 7 are adhered so tightly. As a result, a cut terminal portion S of the prepreg sheet 8 (cut piece 21) is peeled up and the curling-up occurs as shown in FIG. 3, when the prepreg sheet 8 having passed the rear pressing roller 13 is laminated on the work W (or lamination table 2 (body to be laminated)) by the 0-degree layer lamination head 5 (prepreg lamination head).

In this case, the subsequent prepreg sheet 8 is laminated on a work W having the prepreg sheet 8 with the curling-up at the cut terminal portion S. As a result, a prepreg laminated body with a bumpy surface is manufactured (formed), making it difficult to maintain a good product quality.

Additionally, when the subsequent prepreg sheet 8 is laminated on the work W having the curling-up at the cut terminal portion S, the 0-degree layer (prepreg sheet 8) at the cut terminal portion S can be bended due to the applied pressure. The carbon fibers are very vulnerable against the shearing force. Therefore, the intended mechanical characteristic could not be obtained if the prepreg sheet 8 was bended, which is another reason for making it difficult to maintain a good product quality.

The invention has been made in view of the above circumstances and an object thereof is to provide a prepreg lamination head, and a prepreg automatic lamination apparatus equipped with the same, capable of reliably preventing the curling-up at a cut terminal portion of a prepreg sheet to suitably laminate a 0-degree layer prepreg sheet.

Means to Solve the Problems

In order to achieve the above object, the invention provides the following means.

The first aspect of the present invention is a prepreg lamination head for laminating a plurality of prepreg sheets made of fiber sheet impregnated with resin to form a prepreg laminated body, wherein a paper liner being stuck over a first side of the prepreg sheet, and a direction of a fiber in the prepreg sheets being directed to a first direction along with a length direction of the laminated body, the prepreg lamination head including: a first roller, which is provided in a front side of a work being laminated and guides the prepreg sheet to the first direction for the prepreg sheet to be laminated on the work being laminated; a second roller, which is provided in a rear side of the work being laminated and guides the prepreg sheet, which has passed the first roller, for the prepreg sheet to be pressed from the first side of the prepreg sheet and for the paper liner to be peeled off from the first side of the prepreg sheet; and a forward-placed paper liner peeling device, which peels off the paper liner from the first side of the prepreg sheet between the first and second rollers, and guides the prepreg sheet for the peeled paper liner to be pressed and stuck back to the first side of the prepreg sheet with the second roller.

In the first aspect of the present invention, the paper liner can be peeled off between the first roller and the second roller before the paper liner is peeled off by the second roller by providing the forward-placed paper liner peeling device between the first roller and the second roller. Additionally, since the paper liner, which was peeled off by the forward-placed paper liner peeling device, is guided to return to the second roller, and applied to the first side of the prepreg sheet while the prepreg sheet is pressed by the second roller, similarly to the related art, it is possible to press the prepreg sheet by the second roller through the paper liner, and integrally laminate the prepreg sheet on the body to be laminated (work).

When the paper liner is guided by the second roller and peeled off from the first side of the prepreg sheet, since the paper liner has been peeled off once from the prepreg sheet by the forward-placed paper liner peeling device, the adhesive force between the prepreg sheet and the paper liner is weakened. Thus, it is possible to easily peel off the paper liner from the first side of the prepreg sheet. For this reason, the curling-up, which occurs at the cut terminal portion of the prepreg sheet (cut piece) having passed the second roller (rear pressing roller) when the paper liner is peeled off from the work to be laminated as in the conventional auto laminating apparatus, can be prevented.

In the prepreg lamination head of the first aspect of the present invention, the forward-placed paper liner peeling device may include a third roller, which is provided above the first and second rollers and on which the liner paper between the first and second rollers is hanged over.

In the first aspect of the invention having the above configuration, the paper liner can be peeled off from the first side of the prepreg sheet having passed the first roller by providing the third roller between the first roller and the second roller and hanging over the paper liner on the third roller. Additionally, it is possible to guide the paper liner with the third roller so as to return the paper liner to the second roller reliably and easily.

In the first aspect of the invention having the above configuration, the forward-placed paper liner peeling device, which includes the third roller, may include: a scraper, which peels off the paper liner from the first side of the prepreg sheet having passed the first roller and guide the peeled paper liner to the third roller, the scraper being provided between the first and third rollers in the first direction, and below the third roller.

In the first aspect of the present invention having the above configuration, the paper liner can be more reliably peeled off from the first side of the prepreg sheet having passed the first roller by providing the scraper between the first roller and the second roller below the third roller.

The second aspect of the present invention is a prepreg automatic lamination apparatus for producing a prepreg laminated body by laminating a plurality of prepreg sheets formed by impregnation of a fiber sheet in resin including: the prepreg lamination head of any one of the first aspect of the present invention described above; and a lamination table, which allows a forward and a backward movement of the work being laminated relative to the prepreg lamination head in the first direction, wherein the lamination table includes: a plurality of suction holes opening at a top surface of the lamination table on which the work to be laminated is placed; and the work to be laminated is maintained in a stuck-state by sucking air from the suction holes.

In the prepreg automatic lamination apparatus of the second aspect of the present invention, any one of the above described prepreg lamination heads is included. Therefore, the curling-up, which occurs at the cut terminal portion of the prepreg sheet (cut piece) having passed the second roller (rear pressing roller) when the paper liner is peeled off from the work to be laminated as in the conventional auto laminating apparatus, can be prevented. Additionally, the lamination table is formed so as to include the plurality of suction holes, and air is sucked through the suction holes to hold the body to be laminated in an adsorbed state. Therefore, even if the curling-up occurs at the cut terminal portion, it is possible to suck air through the suction holes, and suck the cut terminal portion toward the lamination table (toward the body to be laminated) to return the cut terminal portion to its original position.

Advantageous Effects of Invention

In the prepreg lamination head and the prepreg automatic lamination apparatus of the present invention, the paper liner can be peeled off between the first roller and the second roller before the paper liner is peeled off by the second roller by providing the forward-placed paper liner peeling device between the first roller and the second roller. Additionally, it is possible to return the paper liner, which has been peeled off once by the forward-placed paper liner peeling device to the second roller, and as in the related art, it is possible to press the prepreg sheet by the second roller through the paper liner, and integrally laminate the prepreg sheet on the body to be laminated (work).

When the paper liner is guided by the second roller and peeled off from the first side of the prepreg sheet, the paper liner has been peeled off from the prepreg sheet once by the forward-placed paper liner peeling device. Therefore, the curling-up, which occurs at the cut terminal portion of the prepreg sheet (cut piece) having passed the second roller (rear pressing roller) when the paper liner is peeled off from the work to be laminated as in the conventional auto laminating apparatus, can be prevented.

Additionally, in the prepreg automatic lamination apparatus of the invention, even if the curling-up occurs at the cut terminal portion, it is possible to suck air through the suction holes and to suck the cut terminal portion toward the lamination table (toward the body to be laminated) so as to return to its original position.

Hence, according to the prepreg lamination head and the prepreg automatic lamination apparatus of the present invention, formation of the bumpy surface and bending at the cut terminal portion due to the curling-up at the cut terminal portion of the prepreg sheet can be prevented. As a result, a high quality product can be manufactured (a high quality prepreg laminated body can be formed).

BEST MODE FOR CARRYING OUT THE INVENTION

Figure 1:
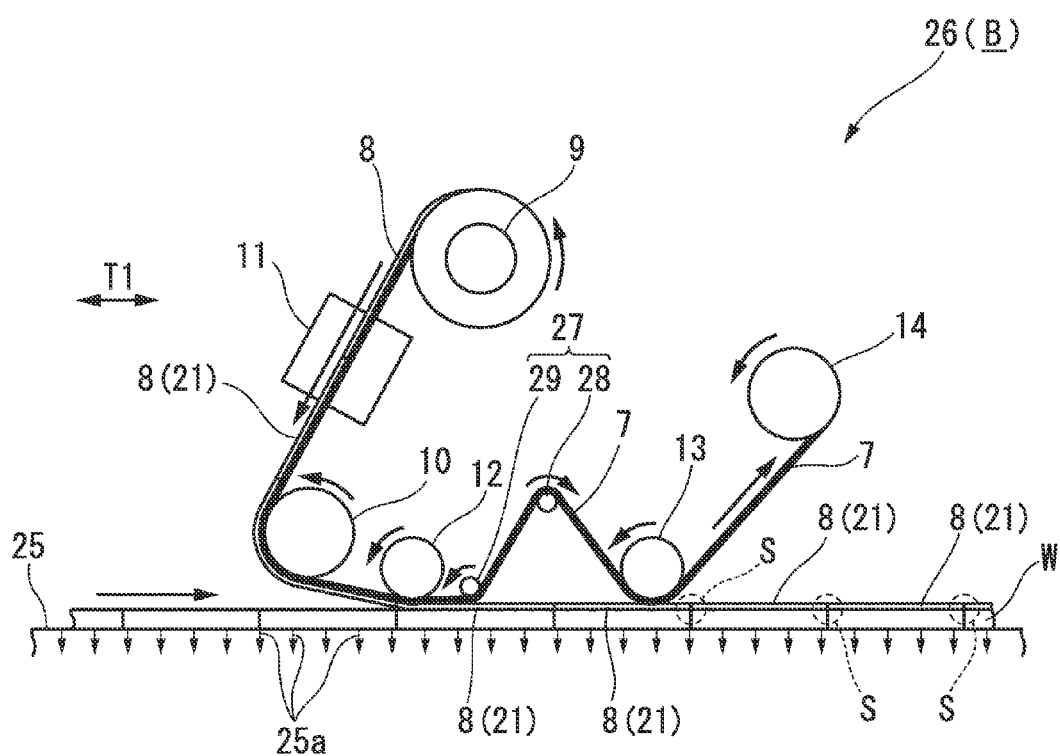
FIG. 1 is a view showing a prepreg lamination head (0-degree layer lamination head) and a prepreg automatic lamination apparatus related to the first embodiment of the present invention.

A prepreg lamination head and a prepreg automatic lamination apparatus equipped with the same related to the first embodiment of the present invention will be described below with reference to FIGS. 1 and 2. The present embodiment relates to a prepreg lamination head for laminating prepreg sheets having a fiber sheet impregnated with resin to manufacture (form) a prepreg laminated body, and a prepreg automatic lamination apparatus equipped with the same. In addition, in the present embodiment, the same components as the 0-degree layer lamination head 5 and the prepreg automatic lamination apparatus A that are shown in FIGS. 2 and 3 are designated by the same reference numerals, and the detailed description thereof is omitted.

Figure 2:
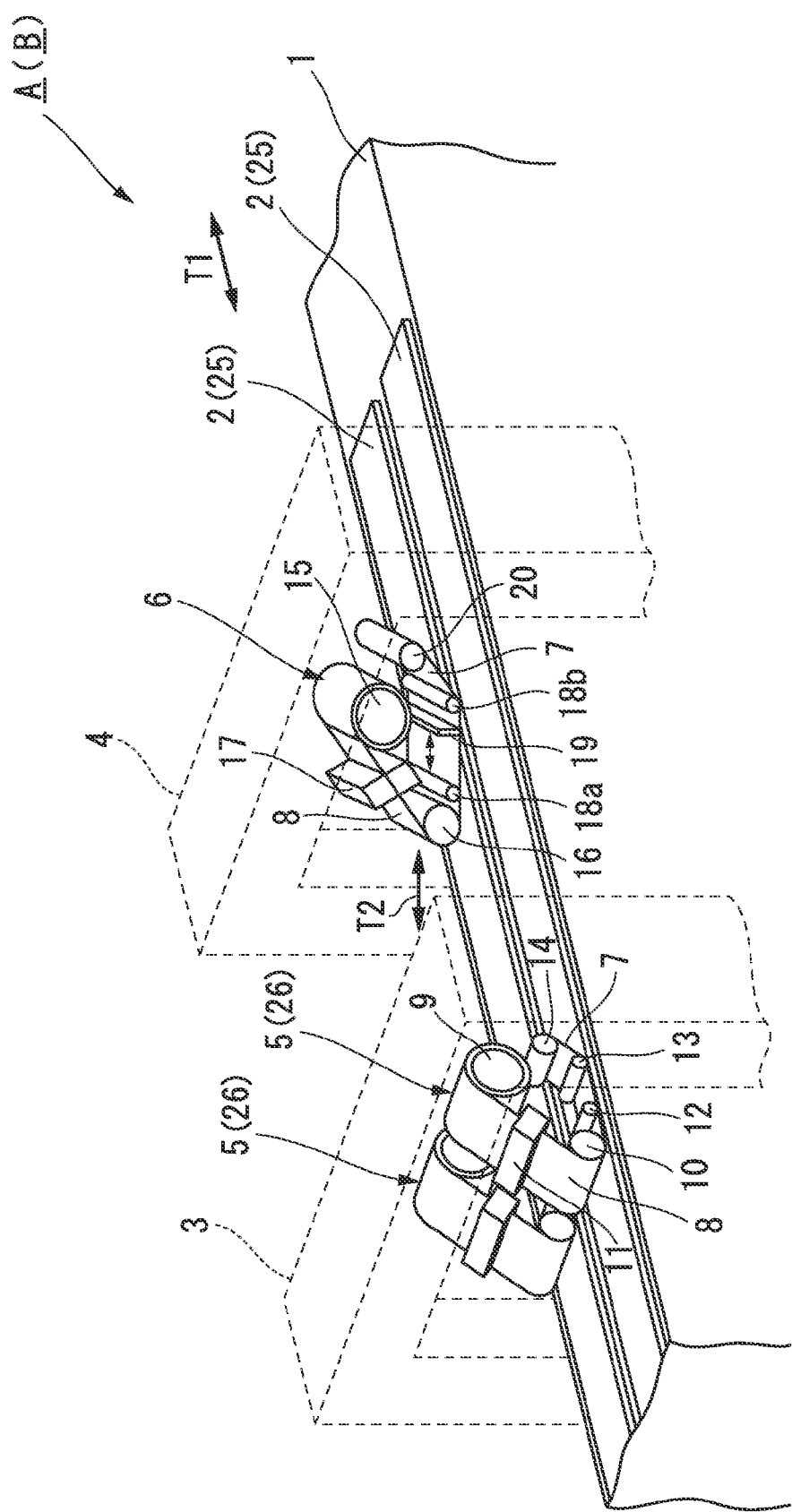
FIG. 2 is a perspective view showing the prepreg automatic lamination apparatus.
Figure 3:
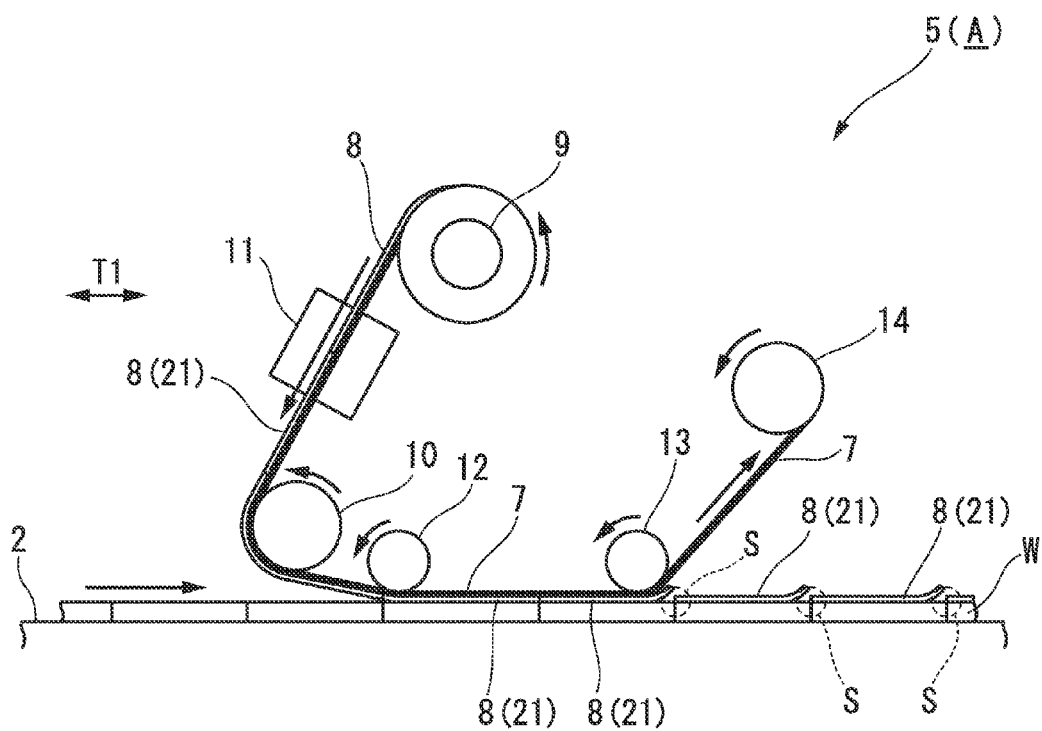
FIG. 3 is a view showing a prepreg lamination head (0-degree layer lamination head) and a prepreg automatic lamination apparatus in the related art.

Similarly to the prepreg automatic lamination apparatus A shown in FIG. 2, a prepreg automatic lamination apparatus B of the present embodiment includes; a lamination table 25 that is provided on a stand 1 and placed so as to freely advance and retreat in the direction T1; a pair of gate-type supports 3 and 4 enclosing the lamination table 2 therebetween with an interval in the direction T1; a 0-degree layer lamination head 26 (prepreg lamination head) that is supported by the gate-type support 3 and disposed above the lamination table 25; an angled layer lamination head 6 on the lamination table 25. The angled layer lamination head 6 is rotatably supported by the other gate-type support 4 allowing rotation around an axis that extends in a vertical direction.

However, in the prepreg automatic lamination apparatus B of the present embodiment, the lamination table 25 is formed using a porous plate, forming multiple (a number of) suction holes 25a opening upward as shown in FIG. 1. And a suction pipe, which is connected to a vacuum suction unit, is provided on the stand 1, for example. The suction pipe is connected to the suction holes 25a. Because of this, the lamination table 25 of the present embodiment can hold the work W (work to be laminated) in the absorbed state via a mold releasing film by suctioning the air through the suction holes 25a by driving the vacuum suction unit.

The 0-degree layer lamination head 26 is a prepreg lamination head for laminating a prepreg sheet 8 to the work W (or the lamination table 25; the body to be laminated) in which fiber directions are turned to the first direction T1 running along the length direction of the prepreg laminated body.

The 0-degree layer lamination head 26 of the present embodiment includes: a feed roller 9; a support roller 10, which supports the prepreg sheet 8 fed from the feed roller 9 by wrapping the prepreg sheet 8 around, a rotary die cutter 11, which cuts the prepreg sheet 8 alone in a pre-determined length (to fit into the size of the laminating piece of the work W) without cutting the paper liner 7; a front pressing roller (first roller) 12, a rear pressing roller (second roller) 13, and a paper liner recovery roller 14, which recovers the paper liner 7 peeled off from the prepreg sheet 8.

The front pressing roller 12 and the rear pressing roller 13 are disposed in the front-and-rear direction (the first direction T1) of the work W. The front pressing roller 12 is provided to guide the prepreg sheet 8 sent from the support roller 10 in the first direction T1 for the prepreg sheet 8 to be laminated on the work W. The front pressing roller 12 also presses the prepreg sheet 8 from the side of the first side of the prepreg sheet 8 for the prepreg sheet 8 to be applied on the work W. On the other hand, the rear pressing roller 13 is provided to press the prepreg sheet 8, which has passed the front pressing roller 12, from the first side again and to guide the paper liner 7 so as to be peeled off from the first side of the prepreg sheet 8.

Moreover, the 0-degree layer lamination head 26 of the present embodiment includes a forward-placed paper liner peeling device 27 that peels off the paper liner 7 from the first side of the prepreg sheet 8 between the front pressing roller 12 and the rear pressing roller 13, presses the prepreg sheet 8 with the rear pressing roller 13, and guides the peeled paper liner 7 so as to be applied back on the surface of the prepreg sheet 8.

The forward-placed paper liner peeling device 27 of the present embodiment includes a paper liner guide roller (third roller) 28 and a scraper roller (scraper) 29. The paper liner guide roller 28 is disposed above the front pressing roller 12 and the rear pressing roller 13. The paper liner 7 between the front and rear pressing rollers 12, 13 is hanged over the paper liner guide roller 28.

The scraper roller 29 is disposed between the front pressing roller 12 and the paper liner guide roller 28 in the first direction T1 below the paper liner guide roller 28, and is disposed so as to peel off the paper liner 7 from the first side of the prepreg sheet 8 having passed the front pressing roller 12 and guide the paper liner 7 to the paper liner guide roller 28.

When a prepreg laminated body is manufactured (formed) using the 0-degree layer lamination head 26 and the prepreg automatic lamination apparatus B equipped with the same, the laminating table 25 is moved forward in the first direction T1, and the paper liner recovery roller 14 is rotated in synchronization with the movement. As a result, the prepreg sheet 8 is fed from the feed roller 9 and cut into pieces with a pre-determined length with the die cutter 11. The prepreg sheet 8 that is cut up in this manner is sent so as to run along the top face of the work W through the support roller 10. Then, the prepreg sheet 8 is pressed (primary transfer pressing) against the work W from the paper liner 7 side by the front pressing roller 12.

In the present embodiment, the paper liner guide roller 28 is disposed above the front pressing roller 12 and the rear pressing roller 13 and the paper liner 7 between the front and rear pressing rollers 12, 13 is hanged over the paper liner guide roller 28. As a result, when the prepreg sheet 8 passes the front pressing roller 12, the paper liner 7 is peeled off from the first side of the prepreg sheet 8, which has applied on the work W, with the paper liner guide roller 28 between the front and rear pressing rollers 12, 13. Then, the peeled paper liner 7 is guided and returned to the rear pressing roller 13 with the paper liner guide roller 28.

Additionally, since the scraper roller 29 is disposed between the front pressing roller 12 and the paper liner guide roller 28 in the first direction T1 below the paper liner guide roller 28, the paper liner 7 is reliably peeled off from the first side of the prepreg sheet 8 having passed the front pressing roller 12, by the scraper roller 29. The paper liner 7 peeled off by the scraper roller 29 is guided to the paper liner guide roller 28 and returned to the rear pressing roller 13 by the paper liner guide roller 28.

As explained above, the paper liner 7, which is peeled off with the forward-placed paper liner peeling device 27 including the paper liner guide roller 28 and the scraper roller 29, is guided back to the rear pressing roller 13. As a result, the paper liner 7 is applied back again to the first side of the prepreg sheet 8 when the prepreg sheet 8 is pressed with the rear pressing roller 13. Consequently, the prepreg sheet 8 is pressed by the rear pressing roller 13 through the paper liner 7 as in the related art. Thus, the prepreg sheet 8 is integrally laminated on the work W securely.

When the paper liner 7 is guided by the rear pressing roller 13 and peeled off from the first side of the prepreg sheet 8, and the paper liner 7 is reeled in by the paper liner recovery roller 14, the adhesive force between the prepreg sheet 8 and the paper liner 7 is weakened since the paper liner 7 is peeled off once from the prepreg sheet 8 by the forward-placed paper liner peeling device 27. For this reason, the paper liner 7 is easily peeled off from the first side of the prepreg sheet 8. Thus, unlike in the related art, the peeling-off and the curling-up of the cut terminal portion S of the prepreg sheet 8 (cut piece 21) do not occur during peeling of the paper liner 7.

Additionally, the lamination table 25 is formed so as to include the multiple suction holes 25a, and air is sucked through the suction holes 25a to hold the work W in an adsorbed state. For this reason, even if curling-up occurs at the cut terminal portion S, air is sucked through the suction holes 25a, the cut terminal portion S is sucked toward the lamination table 25e (the work W) and returned to its original position, and occurrence of the curling-up is also prevented because of this configuration.

Accordingly, in the prepreg lamination head (0-degree layer lamination head) 26 and the prepreg automatic lamination apparatus B equipped with the same in the present embodiment, the forward-placed paper liner peeling device 27 is provided between the front pressing roller 12 and the rear pressing roller 13, so that the paper liner 7 can be peeled off between the front pressing roller 12 and the rear pressing roller 13 before the paper liner 7 is peeled off by the rear pressing roller 13. Additionally, since the paper liner 7 peeled off once by the forward-placed paper liner peeling device 27 in this way is guided back to the rear pressing roller 13, and applied to the first side of the prepreg sheet 8 while the prepreg sheet 8 is pressed by the rear pressing roller 13 as in the related art, it is possible to press the prepreg sheet 8 by the rear pressing roller 13 through the paper liner 7, and integrally laminate the prepreg sheet on the work W.

When the paper liner 7 is guided by the rear pressing roller 13 and peeled off from the first side of the prepreg sheet 8, since the paper liner 7 is peeled off once from the prepreg sheet 8 by the forward-placed paper liner peeling device 27, the adhesive force between the prepreg sheet 8 and the paper liner 7 is weakened. Thus, the curling-up, which occurs at the cut terminal portion S of the prepreg sheet 8 having passed the rear pressing roller 13 when the paper liner 7 is peeled off from the work W as in the related art, can be prevented.

Additionally, in the prepreg automatic lamination apparatus B of the present embodiment, the cut terminal portion S is sucked in toward the side of the lamination table 25 and can be brought back to the original position even if the curling-up occurs at the cut terminal portion S, since the lamination table 25 is formed so as to include the multiple suction holes 25a, and air is sucked through the suction holes 25a to hold the work W in an adsorbed state.

Hence, according to the prepreg lamination head and the prepreg automatic lamination apparatus of the present embodiment, formation of the bumpy surface and bending at the cut terminal portion S due to the curling-up at the cut terminal portion S of the prepreg sheet 8 can be prevented. As a result, a high quality product can be manufactured (a high quality prepreg laminated body can be formed).

Additionally, in the prepreg lamination head 26 and the prepreg automatic lamination apparatus B of the present embodiment, the forward-placed paper liner peeling device 27 is disposed above the front pressing roller 12 and the rear pressing roller 13, and the paper liner 7 between the front and rear pressing rollers 12, 13 is hanged over the paper liner guide roller 28. Because of this configuration, the paper liner 7 can be peeled off securely from the first side of the prepreg sheet 8 right after the prepreg sheet 8 passing the front pressing roller 12. Additionally, the peeled liner paper 7 can be returned to the rear pressing roller 13 securely and easily by guiding the paper liner 7 with the paper liner guide roller 28.

Moreover, since the scraper roller 29 is provided between the front pressing roller 12 and the paper liner guide roller 28 in the one direction T1 below the paper liner guide roller 28, it is possible to more reliably peel off the paper liner 7 from the first side of the prepreg sheet 8 having passed the front pressing roller 12.

Although one embodiment of the prepreg lamination head and the prepreg automatic lamination apparatus equipped with the same related to the present invention has been descried above, the invention is not limited to the above-described embodiment, and can be appropriately changed without departing from the spirit or scope thereof. For example, although it is assumed that the scraper of the forward-placed paper liner peeling device related to the present invention is the scraper roller 29, the scraper related to the present invention is not necessarily limited to the roller as long as the scraper is provided between the front pressing roller 12 and the paper liner guide roller 13 below the paper liner guide roller 28, and is able to peel off the paper liner 7 from the prepreg sheet 8 having passed the front pressing roller 12.

Additionally, in the present embodiment, the forward-placed paper liner peeling device 27 includes two rollers, i.e., the paper liner guide roller 28 and the scraper roller 29. However, the forward-placed paper liner peeling device 27 can be constituted only by the paper liner guide roller 28. Even in this case, while passing the front pressing roller 12, the paper liner 7 can be peeled off once between the front pressing roller 12 and the rear pressing roller 13, and it is possible to obtain the same technical effect as the present embodiment.

In the present embodiment, it has been described that the first roller related to the present invention is the front pressing roller 12, the prepreg sheet 8 sent from the support roller 10 is guided in the first direction T1 by the front pressing roller 12 so as to be laminated on the work W, and the prepreg sheet 8 is pressed from the first side and applied on the work W. However, the first roller related to the present invention does not need to include the function of pressing the prepreg sheet 8 and applying the prepreg sheet on the work W if the first roller can guide the prepreg sheet 8 in the first direction T1 so as to laminate the prepreg sheet on the work W.

In the present embodiment, the prepreg lamination head (0-degree layer lamination head) 26 includes the feed roller 9, the support roller 10, the die cutter 11, the front pressing roller (first roller) 12, the forward-placed paper liner peeling device 27, the rear pressing roller (second roller) 13, and the paper liner recovery roller 14. However, what is needed to the prepreg lamination head related to the present invention is the first roller 12, the second roller 13, and the forward-placed paper liner peeling device 27. Therefore, it is not necessary to configure the other components as in the present embodiment.

Additionally, in the present embodiment, the lamination table 26 is configured so as to advance and retreat in the first direction T1 on the stand 1. However, the gate-type supports 3 and 4 may be configured so as to advance and retreat in the first direction T1 with respect to the lamination table 26. That is, the work W may be placed on the lamination table 25 so as to freely advance and retreat relatively in the first direction T1 with respect to the prepreg lamination head 26.

INDUSTRIAL APPLICABILITY

It is possible to provide a prepreg lamination head and a prepreg automatic lamination apparatus capable of reliably preventing the curling-up from occurring at the cut terminal portion of the prepreg sheet to suitably laminate the 0-degree layer prepreg sheet.

Brief Description of the Reference Symbols

1: STAND
2: RELATED-ART LAMINATION TABLE
3: FIRST GATE-TYPE SUPPORT
4: SECOND GATE-TYPE SUPPORT
5: RELATED-ART 0-DEGREE LAYER LAMINATION HEAD (PREPREG LAMINATION HEAD)
6: ANGLED LAYER LAMINATION HEAD
7: PAPER LINER
8: PREPREG SHEET
9: FEED ROLLER
10: SUPPORT ROLLER
11: DIE CUTTER
12: FRONT PRESSING ROLLER (FIRST ROLLER)
13: REAR PRESSING ROLLER (SECOND ROLLER)
14: PAPER LINER RECOVERY ROLLER
15: FEED ROLLER
16: SUPPORT ROLLER
17: DIE CUTTER
18a: GUIDE ROLLER
18b: SCRAPER ROLLER (GUIDE ROLLER)
19: LAMINATION SHOE
20: PAPER LINER RECOVERY ROLLER
21: CUT PIECE
25: LAMINATION TABLE
25a: SUCTION HOLE
26: 0-DEGREE LAYER LAMINATION HEAD (PREPREG LAMINATION HEAD)
27: FORWARD-PLACED PAPER LINER PEELING DEVICE
28: PAPER LINER GUIDE ROLLER (THIRD ROLLER)
29: SCRAPER ROLLER (SCRAPER)
A: RELATED-ART PREPREG AUTOMATIC LAMINATION APPARATUS
B: PREPREG AUTOMATIC LAMINATION APPARATUS

S: CUT TERMINAL PORTION
T1: FIRST DIRECTION (LENGTH DIRECTION OF PREPREG LAMINATED BODY, FRONT-AND-REAR DIRECTION)
T2: INTERSECTION DIRECTION
W: WORK (BODY TO BE LAMINATED)

The invention claimed is:

1. A prepreg lamination head for laminating a plurality of prepreg sheets made of fiber sheet impregnated with resin to form a prepreg laminated body, wherein a paper liner being stuck over a first side of the prepreg sheet, and a direction of a fiber in the prepreg sheets being directed to a first direction along with a length direction of the laminated body, the prepreg lamination head comprising:
   a first roller, which is provided in a front side of a work being laminated and guides the prepreg sheet to the first direction for the prepreg sheet to be laminated on the work being laminated;
   a second roller, which is provided in a rear side of the work being laminated and guides the prepreg sheet, which has passed the first roller, for the prepreg sheet to be pressed from the first side of the prepreg sheet and for the paper liner to be peeled off from the first side of the prepreg sheet; and
   a forward-placed paper liner peeling device, which peels off the paper liner from the first side of the prepreg sheet between the first and second rollers, and guides the prepreg sheet for the peeled paper liner to be pressed and stuck back to the first side of the prepreg sheet with the second roller.

2. The prepreg lamination head according to claim 1, wherein the forward-placed paper liner peeling device comprises:
   a third roller, which is provided above the first and second rollers and on which the liner paper between the first and second rollers is hanged over.

3. The prepreg lamination head according to claim 2, wherein the forward-placed paper liner peeling device, which includes the third roller, comprises:
   a scraper, which peels off the paper liner from the first side of the prepreg sheet having passed the first roller and guide the peeled paper liner to the third roller, the scraper being provided between the first and third rollers in the first direction, and below the third roller.

4. A prepreg automatic lamination apparatus for producing a prepreg laminated body by laminating a plurality of prepreg sheets formed by impregnation of a fiber sheet in resin comprising:
   the prepreg lamination head according to claim 1; and
   a lamination table, which allows a forward and a backward movement of the work being laminated relative to the prepreg lamination head in the first direction,
   wherein the lamination table comprises:
      a plurality of suction holes opening at a top surface of the lamination table on which the work to be laminated is placed; and
      the work to be laminated is maintained in a stuck-state by sucking air from the suction holes.

5. A prepreg automatic lamination apparatus for producing a prepreg laminated body by laminating a plurality of prepreg sheets formed by impregnation of a fiber sheet in resin comprising:
   the prepreg lamination head according to claim 2; and
   a lamination table, which allows a forward and a backward movement of the work being laminated relative to the prepreg lamination head in the first direction,
   wherein the lamination table comprises:
      a plurality of suction holes opening at a top surface of the lamination table on which the work to be laminated is placed; and
      the work to be laminated is maintained in a stuck-state by sucking air from the suction holes.

6. A prepreg automatic lamination apparatus for producing a prepreg laminated body by laminating a plurality of prepreg sheets formed by impregnation of a fiber sheet in resin comprising:
   the prepreg lamination head according to claim 3; and
   a lamination table, which allows a forward and a backward movement of the work being laminated relative to the prepreg lamination head in the first direction,
   wherein the lamination table comprises:
      a plurality of suction holes opening at a top surface of the lamination table on which the work to be laminated is placed; and
      the work to be laminated is maintained in a stuck-state by sucking air from the suction holes.

\* \* \* \* \*